United States Patent [19]

Amano et al.

[11] Patent Number: 5,226,012

[45] Date of Patent: Jul. 6, 1993

[54] BUFFER MEMORY CIRCUIT HAVING CONSTANT PROPAGATION DELAY

[75] Inventors: Toru Amano; Ichiro Hirai, both of Tokyo, Japan

[73] Assignee: NEC Corporation, Tokyo, Japan

[21] Appl. No.: 784,317

[22] Filed: Oct. 29, 1991

[30] Foreign Application Priority Data

Oct. 30, 1990 [JP] Japan .................................. 2-292899

[51] Int. Cl.$^5$ .............................................. G11C 13/00
[52] U.S. Cl. ............................ 365/189.05; 365/189.12; 365/230.08
[58] Field of Search ...................... 365/189.05, 189.01, 365/189.04, 233, 230.08, 189.12

[56] References Cited

U.S. PATENT DOCUMENTS 5,083,269  1/1992  Syobatake et al. ............. 365/189.12

*Primary Examiner*—Terrell W. Fears
*Attorney, Agent, or Firm*—Foley & Lardner

[57] ABSTRACT

A buffer memory circuit has a memory circuit for receiving input data possessing a transmission rate selected out of a plurality of predetermined transmission rates, a write-in clock signal synchronized with these input data and a read-out clock signal having a predetermined rate. The memory circuit stores the input data according to the write-in clock signal, and supplies the input data, which have been stored, as output data according to the read-out clock signal. A detecting circuit detects an overflow or an underflow in the memory circuit, and supplies a resetting pulse signal for initializing the memory circuit. A control circuit receives the write-in clock signal and the resetting pulse, and suspends the supply of the read-out clock signal to the memory circuit means for a certain period of time, determined by the first transfer rate, from the time of receiving the resetting pulse signal.

7 Claims, 3 Drawing Sheets

DETECTION PULSE   g

1536 Kb/s

READ-OUT CONTROL   j

Fig. 3c   d
READ-OUT CLOCK

Fig. 3d   c
READ-OUT DATA t

768 Kb/s

READ-OUT CONTROL   j

READ-OUT CLOCK   d

Fig. 3g   c
READ-OUT DATA t

BUFFER MEMORY CIRCUIT HAVING CONSTANT PROPAGATION DELAY

BACKGROUND OF THE INVENTION

The present invention relates to a buffer memory circuit for use in the smoothing of burst data and rate adjustment among data transmitted at different rates.

Conventionally, a buffer memory circuit of this kind is used, for instance in a video signal coding/decoding apparatus (CODEC), for adjusting multiplexed data of coded picture data and speech data to the clock of the transmission line, or adjusting received data to the clock of the apparatus. Usually in such a buffer memory circuit, the buffer memory is reset when an overflow or an underflow of accumulated data occurs to invalidate the data accumulated by that time. When the buffer memory circuit starts operating and in its initial state immediately after resetting, the read-out is started after a certain quantity of data have been accumulated in the buffer memory in order to prevent an underflow. When this buffer memory circuit is applied to a system in which one of a plurality of data transmission rates is selectively used, as in a video signal CODEC according to the CCITT Recommendation H.261, there will arise differences in the period from the time of resetting or the operation start of the buffer memory to the starting time of read-out of the accumulated data, i.e. in the delay time, because the time required for data accumulation in the initial state differs with the selected data transmission rate. Thus in a buffer memory circuit according to the prior art, the delay time differs with the data transmission rate because the read-out is started after a certain quantity of data has been accumulated in the initial state irrespective of the data transmission rate. Especially where widely different data transmission rates are selectively used, the delay time difference between the highest and the lowest rates becomes correspondingly greater, resulting in the problem that, in a TV conference system for example, a longer time is taken from the moment when the power supply is turned on at the lowest level of the data transmission rate until the emergence of the picture on the screen.

SUMMARY OF THE INVENTION

An object of the present invention, therefore, is to provide a buffer memory circuit embodying a solution to the aforementioned problem, i.e. a buffer memory circuit whose delay time is constant, independent of the data transmission rate.

According to one aspect of the invention, a buffer memory circuit comprises a memory circuit for receiving input data having a first transmission rate selected out of a plurality of predetermined transmission rates, a write-in clock signal synchronized with these input data and a read-out clock signal having a predetermined rate. The memory circuit stores the input data according to the write-in clock signal, and supplies the input data, which have been stored, as output data according to the read-out clock signal. A detecting circuit detects an overflow or an underflow in the memory circuit, and supplies a resetting pulse signal for initializing the memory circuit. A control circuit receives the write-in clock signal and the resetting pulse, and suspends the supply of the read-out clock signal to the memory circuit means for a certain period of time, determined by the first transfer rate, from the time of receiving the resetting pulse signal.

BRIEF DESCRIPTION OF THE DRAWINGS

FIGS. 3a to 3g are waveforms illustrating the operation of the buffer memory circuit of FIG. 1.

DETAILED DESCRIPTION OF THE PREFERRED EMBODIMENT

Figure 1:
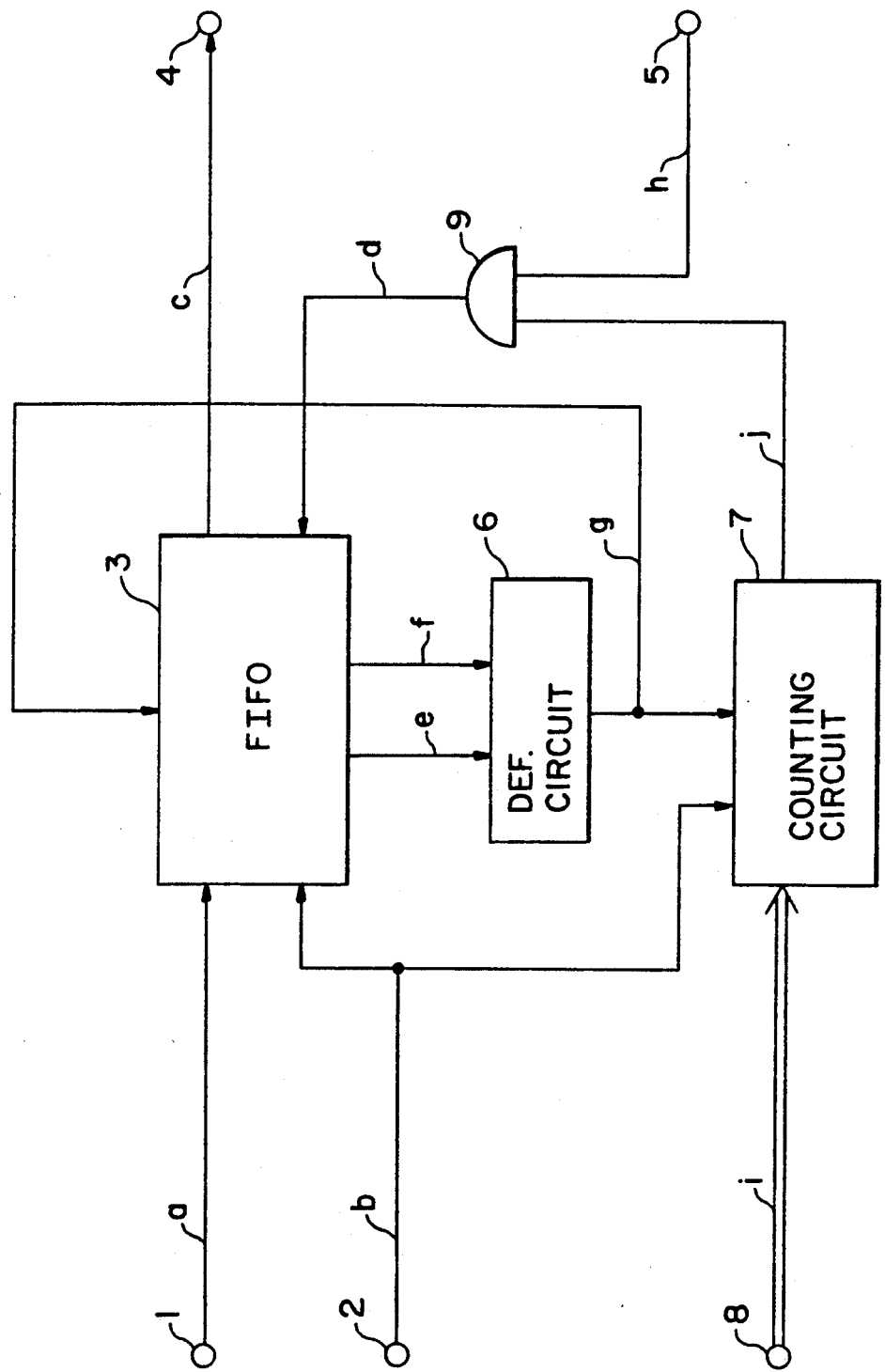
FIG. 1 is a block diagram illustrating a buffer memory circuit, which is a preferred embodiment of the invention.

Referring to FIG. 1, the buffer memory circuit of the invention comprises a first-in first-out (FIFO) memory circuit 3. A differentiating circuit 6 detects an underflow flag e and an overflow flag f of the FIFO memory circuit 3 and generates a detection pulse g. A counting circuit 7, responsive to a data rate information i from outside, a write-in clock signal b and the detection pulse g from the differentiating circuit 6, generates a read-out control signal j. An AND gate 9 receives a read-out clock signal h supplied from outside and the read-out control signal j from the counting circuit 7 and supplies its output to the FIFO memory circuit 3 as a read-out clock signal d. To describe the operation of this circuit, input data a supplied via a data input terminal 1 are written into the FIFO memory circuit 3 in accordance with the write-in clock signal b supplied in synchronism from a write-in clock input terminal 2. On the other hand, data are read out of the FIFO memory circuit 3 in accordance with an effective read-out clock pulse d, which is the logical product, from the AND gate 9, of the read-out clock h supplied from a read-out clock input terminal 5 and the read-out control signal j generated by the counter circuit 7. Read-out data c are supplied via a data output terminal 4. When the FIFO memory circuit 3 is not in its initial state, the read-out control signal j is at a high level, and the read-out clock signal h is directly used as the effective read-out clock signal d. When the FIFO memory circuit 3 runs into an underflow or an overflow state, a change occurs in the level of a pin predetermined as the underflow or overflow flag of the FIFO memory circuit 3. The differentiating circuit 6 monitors the levels of the underflow flag e and the overflow flag f of the FIFO memory circuit 3 and, if either level changes, will generate the detection pulse g indicating the occurrence of an overflow or an underflow. The detection pulse g is fed to both the resetting terminal of the FIFO memory circuit 3 and the counting circuit 7. The counting circuit 7 outputs the low-level read-out control signal j for a prescribed period from the time of receiving the detection pulse g according to the data transmission rate information i indicating the transmission rate of the input data a which is equal to a rate of transmission line, given via a rate information input terminal 8, and the write-in clock signal b. As a result, the data read-out from the FIFO memory circuit 3 is suspended for the prescribed period. Hereupon, in the buffer memory circuit according to the present invention, the quantity of data accumulated in the initial state (the initial accumulated quantity) is varied with the input data transmission rate so as to make constant, irrespective of the transmission rate of input data, the duration of the disabling of data read-out from the FIFO memory circuit 3, i.e. the length of time required for data accumulation accomplished in the initial state of the FIFO memory 3. More specifically, this is achieved by reducing the initial accumulated quantity with a decrease in the transmission rate of input data.

Figure 2A:
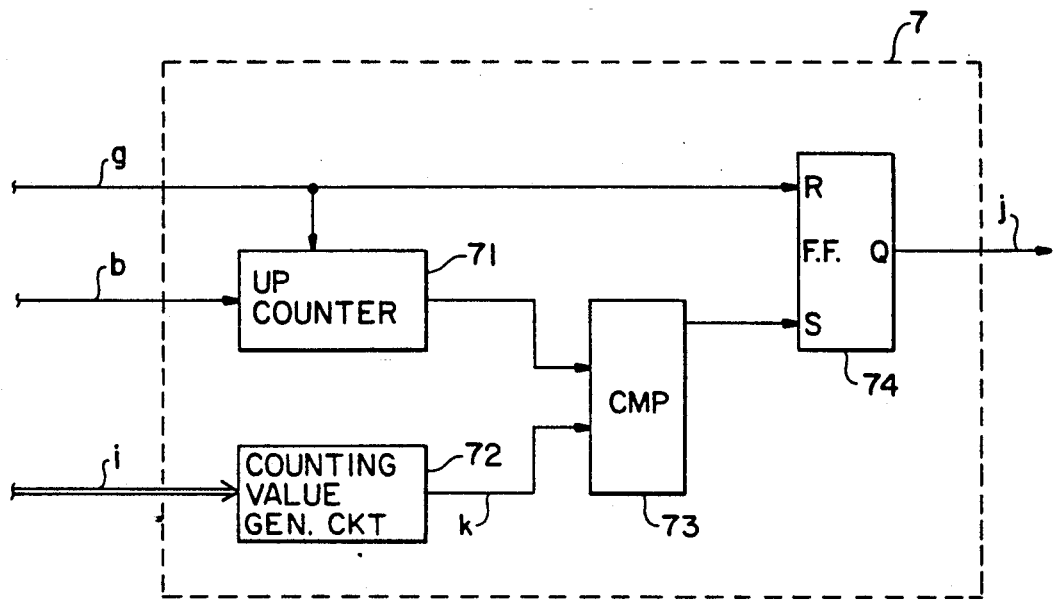
FIGS. 2a and 2b are block diagrams illustrating specific examples of the counter circuit in FIG. 1.

FIG. 2a is a block diagrams illustrating a first preferred example of the counting circuit 7 in FIG. 1. The counting circuit 7 comprises an up counter 71, an accumulation value generating circuit 72 for generating the initial accumulation value of input data, a comparator 73 and a flip-flop (F/F) 74. The up counter 71 is reset by the detection pulse g from the differentiating circuit 6, and counts the number of pulses of the write-in clock b. The accumulation value generating circuit 72 generates a predetermined initial accumulation value k corresponding to the data transmission rate information i. The comparator 73 compares the count signal from the up counter 71 and the initial accumulation value, and generates an identity pulse when it finds them identical. The F/F 73, which is a set-reset F/F which receives the detection pulse g at its reset terminal and the identity pulse at its set terminal, supplies a data output Q as a read-out control signal j. When the differentiating circuit 6 generates the detection pulse g at the time the power supply is turned on, upon occurrence of an overflow or an underflow of the FIFO memory circuit 3, the F/F 74 is reset to bring down the level of the read-out control signal j. As a result, the AND gate 9 is turned off, and no read-out clock is supplied to the FIFO memory circuit 3. The detection pulse g is also fed to the reset terminal of the up counter 71 to initialize the up counter 71, which counts the number of pulses of the write-in clock b. Since the number of pulses of the write-in clock b is equal to the number of data accumulated in the FIFO memory circuit 3, it can be known whether or not a prescribed number of data have been accumulated by comparing the count signal of the up counter 71 with the prescribed accumulation value. The comparator 73 compares the count signal from the counter 71 and the accumulation value from the accumulation value generating circuit 72, and generates the identity pulse when it finds them identical. The identity pulse is supplied to the set terminal of the F/F 74 to raise the data output Q to its high level. As the high-level read-out control signal j causes the AND gate 9 to be turned on, the supply of the read-out clock to the FIFO memory circuit 3 is resumed.

Figure 2B:
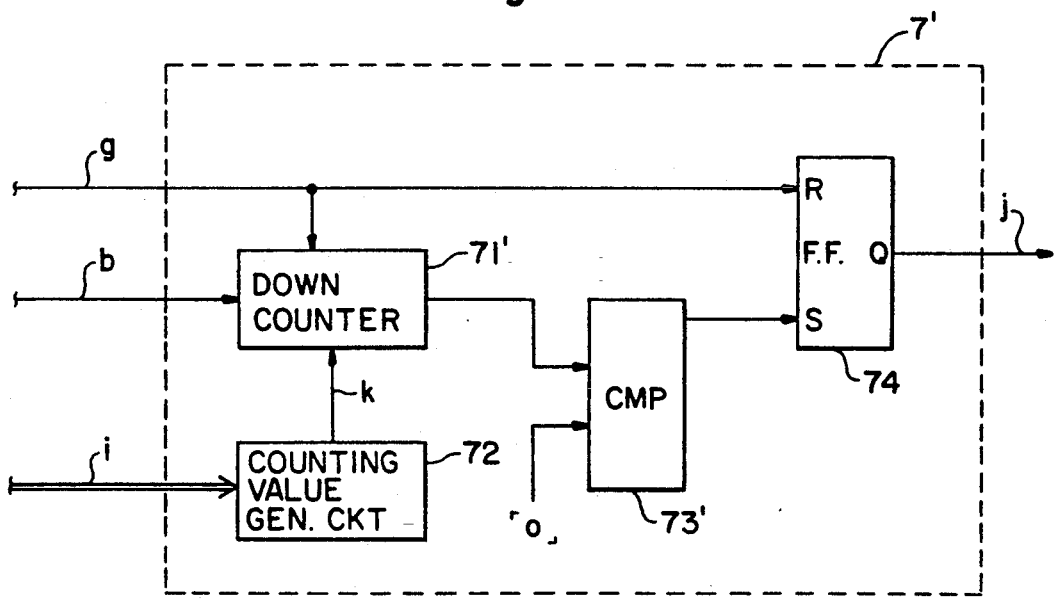

FIG. 2b is a block diagram illustrating another preferred example of the counting circuit, which differs from the example of FIG. 2a in that a down counter 71' is used in place of the up counter 71. Thus, as it is initialized by the detection pulse g, the down counter 71' reads the initial accumulation value k as its initial value, and counts the initial value down in response to the pulse of the write-in clock b. A comparator 73' compares the count signal of the down counter 71' with zero and generates an identity pulse when it has found them identical. Other aspects of the operation will not be described here because they are identical with the corresponding aspects of the example of FIG. 2a.

The accumulation value generating circuit 72 in FIGS. 2a and 2b can be realized with a read only memory (ROM) having the data transmission rate information i as its address.

Figure 3A:
Figure 3B:
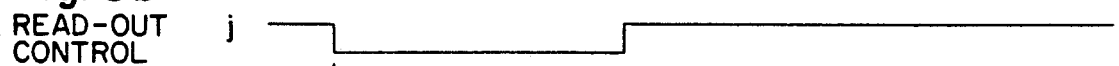
Figure 3B:
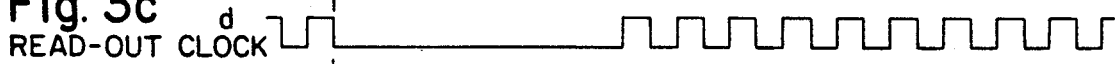
Figure 3B:
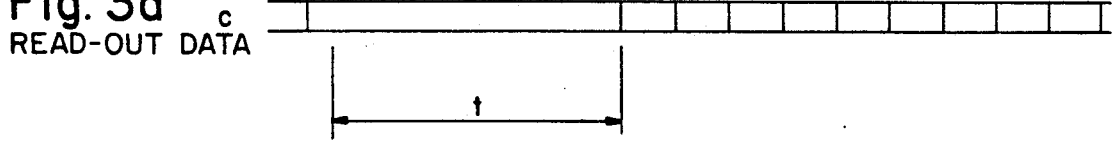
Figure 3E:
Figure 3F:
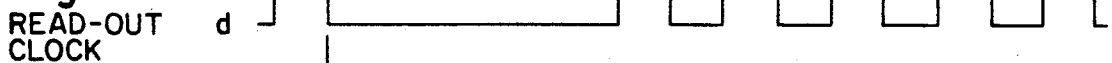
Figure 3F:
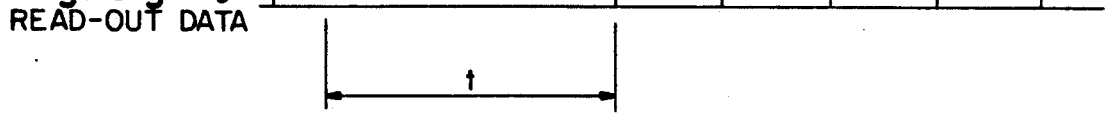

Next will be described the operation of the buffer memory circuit according to the present invention with reference to FIGS. 3a to 3g. FIGS. 3b to 3d illustrate a case in which the data transmission rate is 1536 kbps. When an underflow or an overflow occurs in the FIFO memory circuit 3, the detection pulse g is generated by the differential circuit 6 (FIG. 3a). Receiving the detection pulse g, the counting circuit 7 reduces the level of the read-out control signal j (FIG. 3b). As a result, the AND gate 9 is turned off, the effective read-out clock signal d is no longer generated (FIG. 3c), and the data read-out is suspended (FIG. 3c). As a quantity of data matching the data transmission rate are accumulated in the FIFO memory circuit 3, the read-out control signal j rises to its high level (FIG. 3b), and the effective read-out clock signal d (FIG. 3c) is supplied to the FIFO memory circuit 3. FIGS. 3e to 3g, respectively corresponding to FIGS. 3b to 3d, illustrate a case in which the data transmission rate is 768 kbps. At this data transmission rate of 768 kbps, if the initial accumulated quantity is set to be a/2, where a is the initial accumulated quantity in the case of the 1536 kbps data transmission rate, the delay time t will be equal irrespective of the data transmission rate.

As hitherto described, a buffer memory circuit according to the present invention enables the delay time by the buffer memory to be constant independent of the transmission rate of input data by varying the initial accumulated quantity of input data according to the transmission rate of the input data, and provides the benefit of making it possible to reduce the delay time, especially when the data transmission rate is low, in a system in which the data transmission rate is variable.

What is claimed is:

1. A buffer memory circuit comprising:
   a memory circuit for receiving input data having a transmission rate, a write-in clock signal synchronized with said input data and a read-out clock signal having a predetermined rate;
   said memory circuit storing said input data according to said write-in clock signal, and supplying said input data, which have been stored, as output data according to said read-out clock signal;
   a detecting circuit for detecting an overflow or an underflow in said memory circuit, and supplying a resetting pulse signal for initializing said memory circuit, and supplying a resetting pulse signal for initializing said memory circuit; and
   a control circuit for receiving said write-in clock signal and said resetting pulse, and suspending the supply of said read-out clock signal to said memory circuit for a certain period of time, determined by said transmission rate, from the time of receiving said resetting pulse signal.

2. A buffer memory circuit, as claimed in claim 1, wherein said control circuit comprises:
   an accumulation value generating circuit for receiving rate information indicating said transmission rate and generating an accumulation value corresponding to said transmission rate, and
   a counting circuit for suspending the supply of said read-out clock signal to said memory circuit from the time of receiving said resetting pulse signal until the number of said write-in clock signals reaches said accumulation value.

3. A buffer memory circuit, as claimed in claim 2, wherein said counting circuit comprises:
   an up counter means, reset at the time of receiving said resetting pulse signal, for generating a count signal in response to said write-in clock signals;
   a comparator means for comparing said count signal with said accumulation value, and generating an identity pulse signal if they are equal; and a gate means for receiving said resetting pulse signal and said identity pulse signal, said gate means suspending the supply of said read-out clock signal to said memory circuit means from the time of receiving said resetting pulse signal until the time of receiving said identify pulse signal.

4. A buffer memory circuit, as claimed in claim 2, wherein said counting circuit comprises:

a down counter means for reading in said accumulation value as the initial value upon being reset at the time of receiving said resetting pulse signal, said down counter means generating a count signal in response to counting down said initial value according to said write-in clock signal;

comparator means for generating an identity pulse signal when said count signal equals zero; and gate means for receiving said resetting pulse signal and said identity pulse signal, said gate means suspending the supply of said read-out clock signal to said memory circuit means from the time of receiving said resetting pulse signal until the time of receiving said identity pulse signal.

5. A buffer memory circuit, as claimed in claim 1, wherein said transmission rate is selected from a plurality of predetermined transfer rates.

6. A buffer memory circuit, as claimed in claim 3, wherein said transmission rate is selected from a plurality of predetermined transfer rates.

7. A buffer memory circuit, as claimed in claim 4, wherein said transmission rate is selected from a plurality of predetermined transfer rates.

* * * * *